US012606201B2

(12) United States Patent
Abroshan et al.

(10) Patent No.: US 12,606,201 B2
(45) Date of Patent: Apr. 21, 2026

(54) VEHICLE CONTROL SYSTEMS FOR CONTROLLING AUTOMATED VEHICLE ACCELERATION AND BRAKING

(71) Applicant: GM GLOBAL TECHNOLOGY OPERATIONS LLC, Detroit, MI (US)

(72) Inventors: Mehdi Abroshan, Waterloo (CA); Mohammadali Shahriari, Markham (CA); Robert C. Baraszu, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 236 days.

(21) Appl. No.: 18/464,808

(22) Filed: Sep. 11, 2023

(65) Prior Publication Data

US 2025/0083692 A1      Mar. 13, 2025

(51) Int. Cl.
*B60W 60/00* (2020.01)
*B60W 30/095* (2012.01)
*B60W 40/04* (2006.01)
*B60W 40/06* (2012.01)

(52) U.S. Cl.
CPC ...... *B60W 60/001* (2020.02); *B60W 30/0953* (2013.01); *B60W 40/04* (2013.01); *B60W 40/06* (2013.01); *B60W 2556/10* (2020.02); *B60W 2720/106* (2013.01)

(58) Field of Classification Search
CPC ......... B60W 2520/10; B60W 2552/05; B60W 2554/4042; B60W 2554/802; B60W 2556/10; B60W 2720/106; B60W 30/0953; B60W 30/0956; B60W 30/165; B60W 40/04; B60W 40/06; B60W 60/001
See application file for complete search history.

(56) References Cited

U.S. PATENT DOCUMENTS

| | | | | |
|---|---|---|---|---|
| 2010/0256836 A1* | 10/2010 | Mudalige | ................. | G08G 1/22 |
| | | | | 701/25 |
| 2013/0054106 A1* | 2/2013 | Schmudderich | ...... | G01S 13/931 |
| | | | | 701/1 |
| 2020/0057453 A1 | 2/2020 | Laws et al. | | |
| 2021/0001850 A1* | 1/2021 | Shamshiri | ........... | B60W 40/076 |
| 2022/0081005 A1* | 3/2022 | Brown | ................... | G08G 1/162 |
| 2022/0176960 A1* | 6/2022 | Awathe | ................. | G06V 20/58 |

OTHER PUBLICATIONS

Office Action dated Jun. 14, 2024 from German Patent Office for German Patent No. 10 2023 130 668.5; 5pgs.

* cited by examiner

*Primary Examiner* — Wade Miles
*Assistant Examiner* — Jerrod Irvin Davis

(57) ABSTRACT

A method for controlling automated vehicle acceleration and braking includes detecting, via at least one vehicle object sensor of a host vehicle, a closest-in-path (CIP) target vehicle ahead of the host vehicle, obtaining a path history of the CIP target vehicle, the path history including multiple historic positions of the CIP target vehicle at specified time intervals, obtaining a path history of the host vehicle, the path history of the host vehicle including multiple historic positions of the host vehicle at the specified time intervals, comparing the path history of the CIP target vehicle to the path history of the host vehicle to determine a divergence index, and in response to the divergence index being less than a specified divergence threshold, controlling automated acceleration and braking of the host vehicle based at least in part on tracked movement of the CIP target vehicle.

20 Claims, 6 Drawing Sheets

VEHICLE CONTROL SYSTEMS FOR CONTROLLING AUTOMATED VEHICLE ACCELERATION AND BRAKING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle control systems for effectively detecting a closest-in-path (CIP) vehicle, which enables control of automated vehicle acceleration and braking, including distance control from a CIP vehicle.

Some vehicles include object tracking sensors, which identify a closest-in-path (CIP) vehicle driving ahead of a host vehicle. During complex transient maneuvers, a target vehicle may deviate from a linear projection of a host vehicle path. In some situations, an object tracking sensor may not be able to appropriately select a CIP vehicle, hold the CIP vehicle, and drop the CIP vehicle, due to quickly changing states of the host vehicle and the target vehicle. This may result in suboptimal target object tracking, leading to poor longitudinal control performance during, e.g., automated acceleration and crash imminent braking (CIB), adaptive cruise control (ACC), etc.

SUMMARY

A method for controlling automated vehicle acceleration and braking includes detecting, via at least one vehicle object sensor of a host vehicle, a closest-in-path (CIP) target vehicle ahead of the host vehicle, obtaining a path history of the CIP target vehicle, the path history including multiple historic positions of the CIP target vehicle at specified time intervals, obtaining a path history of the host vehicle, the path history of the host vehicle including multiple historic positions of the host vehicle at the specified time intervals, comparing the path history of the CIP target vehicle to the path history of the host vehicle to determine a divergence index, and in response to the divergence index being less than a specified divergence threshold, controlling automated acceleration and braking of the host vehicle based at least in part on tracked movement of the CIP target vehicle.

In other features, the method includes, in response to the divergence index being greater than the specified divergence threshold, dropping tracking of the CIP target vehicle, where automated acceleration and braking of the host vehicle is not controlled based on tracked movement of the CIP target vehicle.

In other features, the method includes, subsequent to dropping tracking of the CIP target vehicle, identifying a second vehicle ahead of the host vehicle, the second vehicle different than the CIP target vehicle, and obtaining an initial path history of the second vehicle, the initial path history of the second vehicle including multiple historic positions of the second vehicle at the specified time intervals.

In other features, the method includes controlling automated lateral movement of the host vehicle via one or more steering actuators, based at least in part of tracked movement of the CIP target vehicle.

In other features, the method includes calculating the specified divergence threshold according to one or more gain parameters, wherein the one or more gain parameters include at least one of a highway road type, an urban road type, a presence of a road anomaly, and a route navigation path.

In other features, the method includes obtaining environmental context data associated with the host vehicle, wherein the environmental context data includes at least one of map data associated with a location of the host vehicle, road data associated with the location of the host vehicle, road anomaly data associated with the location of the host vehicle, route navigation data associated with the location of the host vehicle, and vehicle perception and vision data.

In other features, determining the divergence index includes determining a piecewise localized lateral error position between the path history of the CIP target vehicle and the path history of the host vehicle, determining a piecewise localized heading error between the path history of the CIP target vehicle and the path history of the host vehicle, and combining the piecewise localized lateral error position and the piecewise localized heading error to determine the divergence index based on the piecewise localized lateral error position and the piecewise localized heading error.

In other features, obtaining the path history of the CIP target vehicle includes, in response to an initial detection of the CIP target vehicle as a newly selected target vehicle, constructing a virtual historic initial path of the CIP target vehicle using a systematic dynamically constructed back-propagation behind the CIP target vehicle.

In other features, the method includes determining current state variables of the host vehicle, wherein the current state variables include at least one of a lateral velocity of the host vehicle, a longitudinal velocity of the host vehicle, a yaw rate of the host vehicle, and driver input from at least one of a steering wheel or a pedal, and identifying an updated position of the host vehicle according to the current state variables.

In other features, the method includes transforming coordinates of the multiple historic positions of the CIP target vehicle to generate an updated path history of the CIP target vehicle, transforming coordinates of the multiple historic positions of the host vehicle to generate an updated path history of the host vehicle, and comparing the updated path history of the CIP target vehicle to the updated path history of the host vehicle to determine an updated divergence index.

In other features, the method includes detecting, via the at least one vehicle object sensor of a host vehicle, multiple target vehicles ahead of the host vehicle, tracking movement of each of the multiple target vehicles, and selecting one of the multiple target vehicles as the CIP target vehicle based on the movement of each of the multiple target vehicles.

In other features, selecting one of the multiple target vehicles as the CIP target vehicle includes determining a probabilistic forward travel path of the host vehicle, and selecting one of the multiple target vehicles having a lowest time to collision (TTC) with the host vehicle. In other features, the at least one vehicle object sensor includes at least one of a camera, a laser, or a lidar sensor.

A vehicle control system for controlling automated vehicle acceleration and braking, and steering includes at least one vehicle object sensor configured to detect a closest-in-path (CIP) target vehicle ahead of a host vehicle, and a vehicle control module of the host vehicle, the vehicle control module configured to obtain a path history of the CIP target vehicle, the path history including multiple historic positions of the CIP target vehicle at specified time intervals, obtain a path history of the host vehicle, the path history of the host vehicle including multiple historic positions of the host vehicle at the specified time intervals, compare the path history of the CIP target vehicle to the path history of the host vehicle to determine a divergence index, and in response to the divergence index being less than a specified divergence threshold, control automated acceleration, braking and steering of the host vehicle based at least in part on tracked movement of the CIP target vehicle.

In other features, the vehicle control module is configured to, in response to the divergence index being greater than the specified divergence threshold, drop tracking of the CIP target vehicle, where automated acceleration and braking of the host vehicle is not controlled based on tracked movement of the CIP target vehicle.

In other features, the vehicle control module is configured to, subsequent to dropping tracking of the CIP target vehicle identify a second vehicle ahead of the host vehicle, the second vehicle different than the CIP target vehicle, and obtain an initial path history of the second vehicle, the initial path history of the second vehicle including multiple historic positions of the second vehicle at the specified time intervals.

In other features, the vehicle control module is configured to calculate the specified divergence threshold according to one or more gain parameters, wherein the one or more gain parameters include at least one of a highway road type, an urban road type, a presence of a road anomaly, and a route navigation path.

In other features, the vehicle control module is configured to obtain environmental context data associated with the host vehicle, wherein the environmental context data includes at least one of map data associated with a location of the host vehicle, road data associated with the location of the host vehicle, road anomaly data associated with the location of the host vehicle, route navigation data associated with the location of the host vehicle, and vehicle perception and vision data.

In other features, determining the divergence index includes determining a piecewise localized lateral position error between the path history of the CIP target vehicle and the path history of the host vehicle, determining a piecewise localized heading error between the path history of the CIP target vehicle and the path history of the host vehicle, and combining the piecewise localized lateral position error and the piecewise localized heading error to determine the divergence index based on the piecewise localized lateral error position and the piecewise localized heading error.

In other features, the vehicle control module is configured to determine current state variables of the host vehicle, wherein the current state variables include at least one of a lateral velocity of the host vehicle, a longitudinal velocity of the host vehicle, a yaw rate of the host vehicle, and driver input from at least one of a steering wheel and a pedal, and identify an updated position of the host vehicle according to the current state variables.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
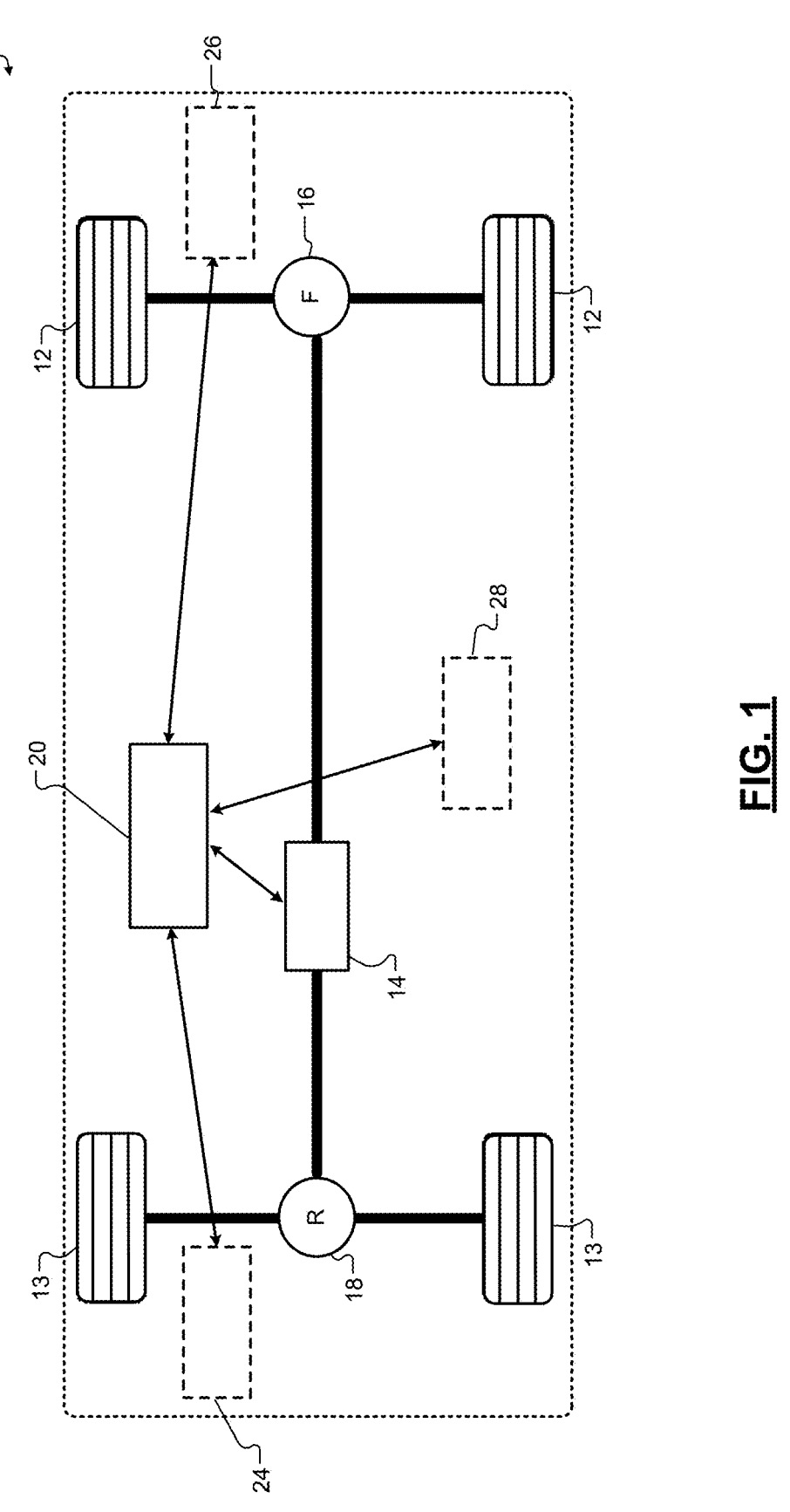
FIG. 1 is a diagram of an example vehicle including object detectors configured for tracking a closest-in-path (CIP) vehicle ahead of a host vehicle.

Some vehicles include object tracking sensors, which identify and track a closest-in-path (CIP) vehicle driving ahead of a host vehicle. During complex transient maneuvers, a target vehicle may deviate from a linear projection of a host vehicle path. In some situations, an object tracking sensor may not be able to appropriately select a CIP vehicle, hold the CIP vehicle, and drop the CIP vehicle, due to quickly changing states of the host vehicle and the target vehicle. This may result in suboptimal target object tracking, leading to poor longitudinal control performance during, e.g., automated acceleration and crash imminent braking (CIB), adaptive cruise control (ACC), etc.

In some example embodiments described herein, a vehicle control module is configured to implement a path divergence rationalization mechanism (which may include an environmental-aware lead-follower quantification metric), to efficiently create a trace memory of a target object in order to correctly hold and drop a CIP target vehicle. The vehicle control module may be configured to construct a back propagated virtual historic path for a CIP target vehicle, without any prior trace that recorded a position history of the CIP target vehicle. The virtual historic path may be constructed according to data obtained regarding environmental constraints (e.g., road conditions) at a location of the CIP target vehicle.

In various implementations, the vehicle control module is configured to execute a mathematical method which identifies a true CIP target vehicle in complex transient maneuvers, such as a roundabout and sharp turns, where other methods such as constant circle and model-based vehicle path prediction fail to operate correctly. In these maneuvers, since the current state of host vehicle and target vehicles are highly unpredictable, a predicted path of the host vehicle might deviate far enough away from a CIP target vehicle to temporarily result in inappropriate dropping of the CIP target vehicle, and subsequent pick up of the CIP target vehicle in an unsuitable manner.

Constant dropping and pick up of a CIP target vehicle through a turn may produce sudden braking and acceleration sequences, such as under features like automated acceleration and crash imminent braking (CIB), which makes a driver uncomfortable and raises safety concerns. Some embodiments described herein include vehicle control modules which are configured to obtain path histories of the host vehicle and target vehicles, in order to perform improved CIP target vehicle identification and holding (e.g., as compared to a vehicle path prediction model only).

For example, a vehicle control module may be configured to use a divergence index to rationalize path histories of the host vehicle and target objects, to improve the performance of a CIP target vehicle track and hold algorithm in different driving scenarios. The vehicle control module may use a lead-follow metric to quantify deviation of the host vehicle and target objects according to the obtained path histories.

A vehicle control module may be configured to construct a virtual path history for target objects that appear unexpectedly, such as approaching a target vehicle that has been stopped at a red light for some time. The virtual path history for the target object may be constructed based at least in part on environmental constraints such as lane markings, road types, etc.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, wheel position sensors, location sensors such as global positioning system (GPS) antennas, etc.). Some sensors may be configured to monitor current motion of the vehicle, acceleration of the vehicle, steering torque, etc.

As shown in FIG. 1, the vehicle 10 includes an optional rear object detector 24, an optional front object detector 26, and an optional side object detector 28. In various implementations, the vehicle 10 may include more or less (or none) of any one of these optional sensors. Each object sensor may include any suitable camera, laser, lidar sensor, etc., which is used to detect objects around the vehicle 10.

In some example embodiments, a vehicle object detector may be configured to detect a closest in-path vehicle (CIPV) (e.g., another vehicle in front of a current driving path of the vehicle 10), a vulnerable road user (VRU) (e.g., a pedestrian or cyclist), etc. The vehicle control module 20 may be configured to control movement of the vehicle 10 based on a detected CIP target vehicle, such as by increasing or decreasing automated acceleration of the vehicle 10 (e.g., via adaptive cruise control), automatically applying brakes of the vehicle 10 (such as in response to a crash imminent braking event), controlling automated lateral movement of the host vehicle via one or more steering actuators, etc.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

The vehicle 10 also includes a user interface. The user interface may include any suitable displays (such as on a dashboard, a console, or elsewhere), a touchscreen or other input devices, speakers for generation of audio, etc.

Figure 2:
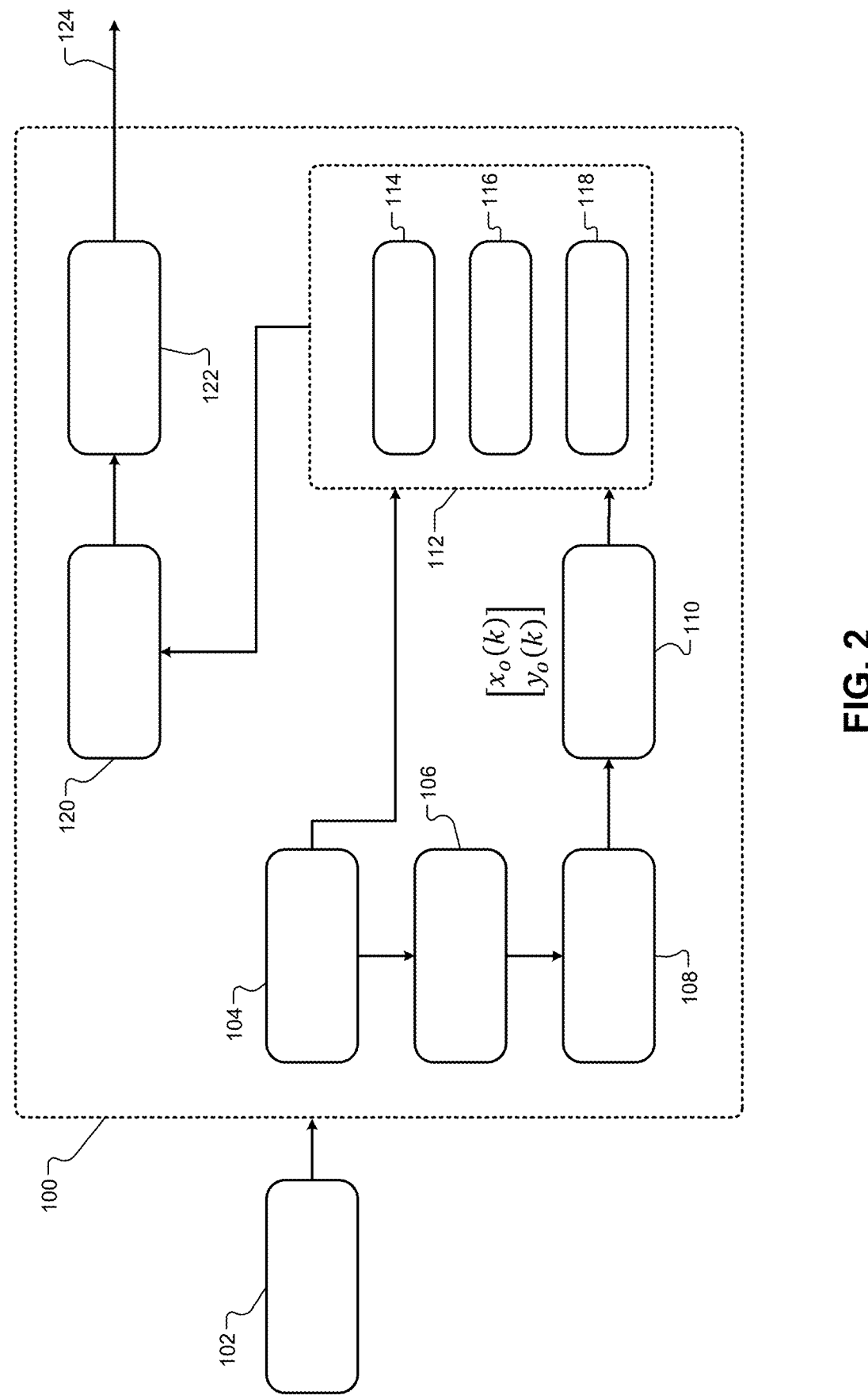
FIG. 2 is a block diagram of an example CIP target vehicle tracking module including vehicle path history comparison.

FIG. 2 is a block diagram of an example CIP target vehicle tracking module 100 including vehicle path history comparison. The CIP target vehicle tracking module 100 may be executed by, for example, the vehicle control module 20 of FIG. 1, using vehicle detection sensor data from the front object detector 26.

The CIP target vehicle tracking module 100 may receive or obtain environmental context extraction data 102, such as map information near a location of the vehicle 10, road information near a location of the vehicle 10, road anomaly information (e.g., road construction) near a location of the vehicle 10, navigation information regarding a planned route of the vehicle 10, etc.

Vehicle state measurement/estimation 104 may include any suitable parameters indicative of a current position of the host vehicle, current movement of the host vehicle, etc. For example, the vehicle control module may be configured to determine host vehicle state parameters such as This module provides host vehicle state variables such as lateral velocity, $v_y$, longitudinal velocity, $v_x$, yaw rate $w_z$, driver input from at least one of a steering wheel or a pedal, etc.

The probabilistic vehicle path prediction 106 may include any suitable algorithm for estimating a future travel path of the host vehicle. For example, a projected path of the host vehicle may be used to select a CIP target from among multiple detected objects, such as selecting a target vehicle on the projected path of the host vehicle which as a lowest time to collision (TTC).

The object categorization and filtration 108 may classify objects which are detected by, e.g., the front object detector 26, such as identifying other vehicles, stationary roadside objects, pedestrians, cyclists, etc.

The initial object path construction 110 is described further below with reference to FIG. 3. For example, a path history of a target vehicle object may be back propagated when a path history is not available (e.g., such as the host vehicle approaching a target vehicle that has been stopped at a red light for some time). The path history may be back propagated using one or more road constraints, such as a centerline or shoulder lines of the road. In some example embodiments, a virtual historic initial path of the CIP target vehicle may be constructed using a systematic dynamically constructed backpropagation behind the CIP target vehicle.

For example, using a vision capability of the front object detector 26 (or other suitable forward facing camera), a vehicle control module may estimate a centerline of a current lane of the host vehicle using a third order polynomial:

$$y_p = c_0 + c_1 x + c_2 x^2 + c_3 x^3$$

In order to generate an initial path history of a target vehicle object (e.g., a newly selected target vehicle or a "never seen before" CIP target vehicle), the vehicle control module may assume that the target vehicle previously followed the road such that initial path history has the same coefficients as the centerline $c_0$, $c_1$, and $c_2$, except $c_3$. Assuming the target vehicle object is following the path, but with a different lateral position, $c_3$ may be calculated as:

$$c_3^{op} = \frac{y_o - (c_0 + c_1 x_o + c_2 x_0^2)}{x_o^3}$$

Using this polynomial, the lateral positions of the desired points on the object's initial path is generated as:

$$\begin{bmatrix} X_o(k) \\ Y_o(k) \end{bmatrix}$$

For the host vehicle, the initial path may be assumed to be straight.

Figure 3:
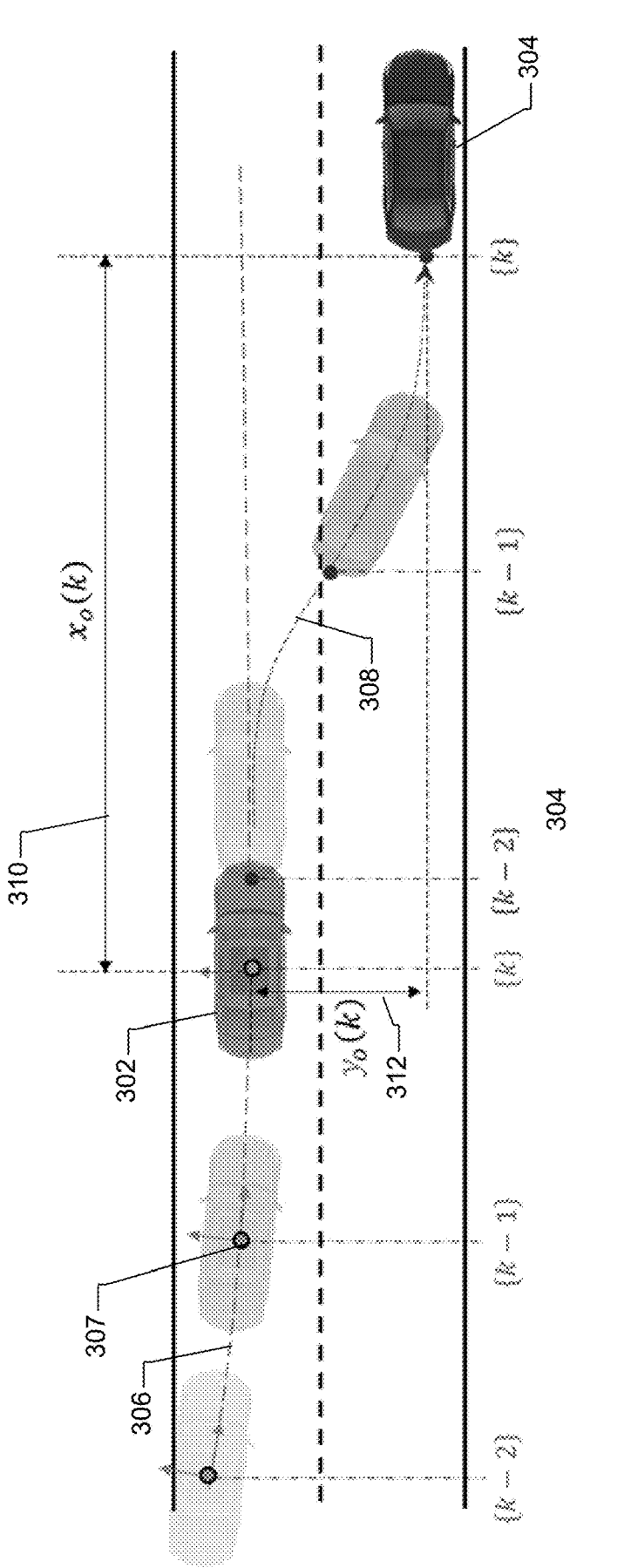
FIG. 3 is diagram illustrating example path histories of a host vehicle and a CIP target vehicle.

FIG. 3 is diagram illustrating example path histories of a host vehicle 302 and a CIP target vehicle 304. As shown in FIG. 3, the host vehicle 302 travels along a path history 306, which includes multiple positions of the host vehicle 302 corresponding to different time intervals.

In the example of FIG. 3, the host vehicle 302 has a current position at a time {k}, and was previously located at a position 307 at a time {k−1}. FIG. 3 also illustrates an example position of the host vehicle 302 at a time {k−2}.

Similarly, the CIP target vehicle 304 has a path history 308, which includes positions at a time {k}, a previous time {k−1}, and a further previous time {k−2}. Because the CIP target vehicle 304 is ahead of the host vehicle 302, the path history 308 of the CIP target vehicle 304 is ahead of the host vehicle 302 in time. The fixed time intervals may be any suitable time period, such as every 100 milliseconds, every 500 ms, every one second, etc.

The vehicle control module may be configured to record positions of the vehicles along the path histories in a longitudinal direction 310 ($x_0(k)$), and a lateral direction 312 ($y_0(k)$). Values of the longitudinal direction 310 and the lateral direction 312 may be compared for each vehicle at each time interval, in order to determine whether the host vehicle 302 is traveling a same path that the CIP target vehicle 304 already traveled.

Returning again to FIG. 2, the path history module 112 may execute several functions, such as path transformation 114, vehicle odometry 116, and a history buffer 118. The path history module 112 may be configured to store path histories of the host vehicle and a target vehicle object, and transform the path histories into coordinates based on a location of the host vehicle in response to a trigger (such as fixed time intervals, etc.).

The history buffer 118 may store a position of the target vehicle object, and provide updates to generate a path of the target vehicle object, using any suitable algorithm such as:

$$\begin{bmatrix} X_o(k) \\ Y_o(k) \end{bmatrix} = \begin{bmatrix} 0_{m\times1} & I_{m\times m} & 0_{m\times1} & 0_{m\times m} \\ 0 & 0_{1\times m} & 0 & 0_{1\times m} \\ 0_{m\times1} & 0_{m\times m} & 0_{m\times1} & I_{m\times m} \\ 0 & 0_{1\times m} & 0 & 0_{1\times m} \end{bmatrix} \begin{bmatrix} X_o(k-1) \\ Y_o(k-1) \end{bmatrix} + \begin{bmatrix} 0_{m\times1} & 0_{m\times1} \\ 1 & 0 \\ 0_{m\times1} & 0_{m\times1} \\ 0 & 1 \end{bmatrix} \begin{bmatrix} x_o(k) \\ y_o(k) \end{bmatrix}$$

where $X_o$ and $Y_o$ are vectors containing the longitudinal and lateral positions history of target object and $x_o$ and $y_o$ are its current longitudinal and lateral positions.

The past position of the host vehicle may be stored and updated according to a calibratable time to generate a host vehicle path history, using any suitable algorithm such as:

$$\begin{bmatrix} X_h(k) \\ Y_h(k) \end{bmatrix} = \begin{bmatrix} 0_{m\times1} & I_{m\times m} & 0_{m\times1} & 0_{m\times m} \\ 0 & 0_{1\times m} & 0 & 0_{1\times m} \\ 0_{m\times1} & 0_{m\times m} & 0_{m\times1} & I_{m\times m} \\ 0 & 0_{1\times m} & 0 & 0_{1\times m} \end{bmatrix} \begin{bmatrix} X_h(k-1) \\ Y_h(k-1) \end{bmatrix}$$

which $X_h$ and $Y_h$ are vectors containing the longitudinal and lateral positions history of host vehicle.

As the position of the target vehicle object and the host vehicle are stored and updated over time, the positions may be transferred according to a new position of the host vehicle. For example, the vehicle odometry 116 may use any suitable algorithm such as:

$$x_h(k) = x_h(k-1) + dt(v_x(k)\cos(\psi_h(k-1)) - v_y(k)\sin(\psi_h(k-1)))$$

$$y_h(k) = y_h(k-1) + dt(v_x(k)\sin(\psi_h(k-1)) + v_y(k)\cos(\psi_h(k-1)))$$

$$\psi_h(k) = \psi_h(k-1) + dt\omega_z$$

The path transformation 114 may use any suitable algorithm such as:

$$\begin{bmatrix} x^n(k) \\ y^n(k) \end{bmatrix} = \mathcal{R} \begin{bmatrix} x(k) - x_h(k) \\ y(k) - y_h(k) \end{bmatrix}$$

where $\mathcal{R}$ is defined as a rotation matrix:

$$\mathcal{R} = \begin{bmatrix} \cos\psi_h(k) & \sin\psi_h(k) \\ -\sin\psi_h(k) & \cos\psi_h(k) \end{bmatrix}$$

Figure 4:
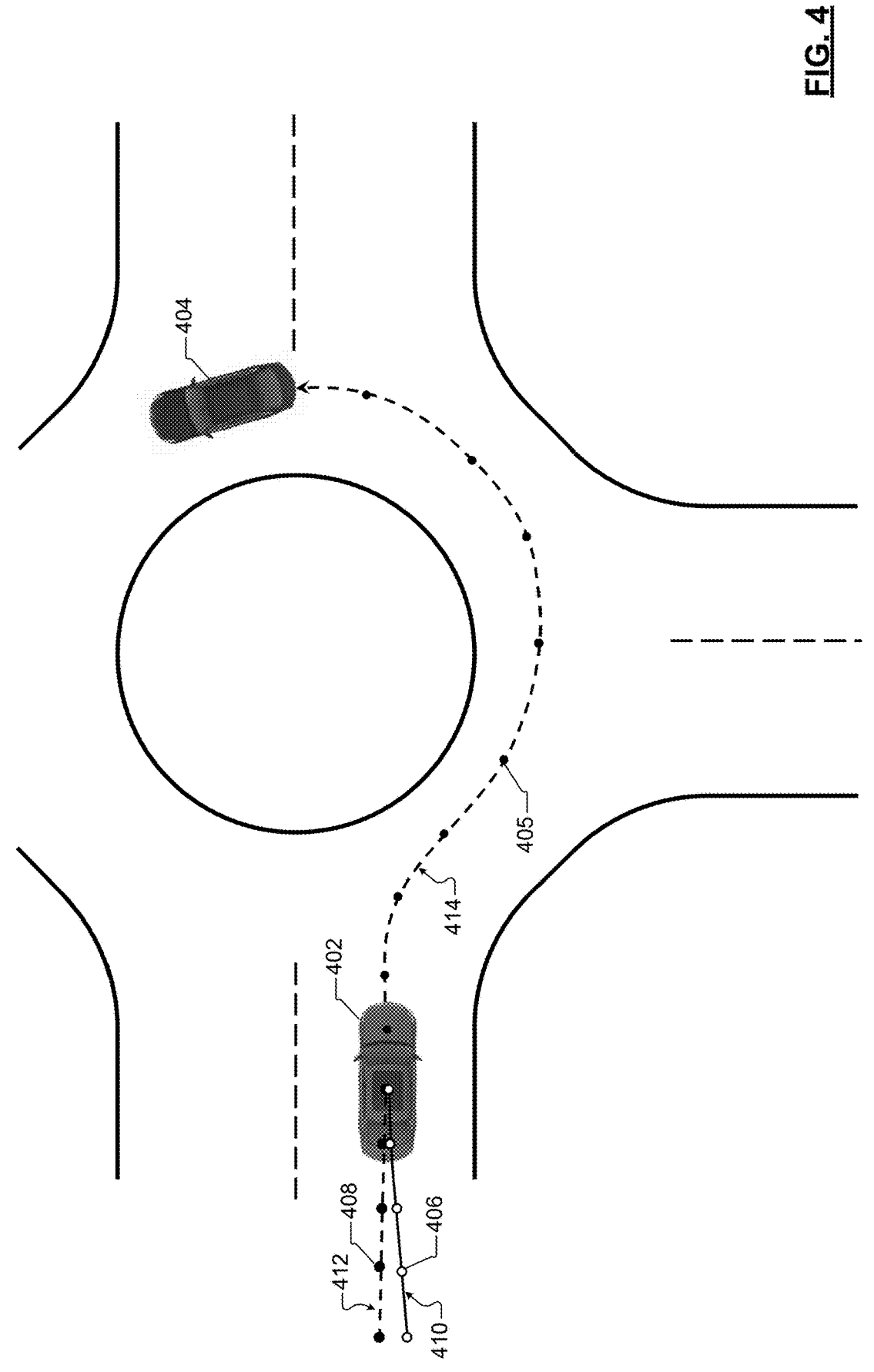
FIG. 4 is a diagram illustrating an example of a CIP target vehicle traveling around a roundabout.

For each set of X/Y vectors, a third order polynomial may be fitted over. As a result, each path history (e.g., the target vehicle object path history and the host vehicle path history) may be represented by four coefficients ($C^{\wedge}=[c\_0^{\wedge}i, c\_1^{\wedge}i, c\_2^{\wedge}i, c\_3^{\wedge}i]$). In some example embodiments, only stored positions of the target vehicle object which are behind the host vehicle are used for polynomial estimation, as shown in FIG. 4. For example, the coefficients may be determined according to a function F that calculates the polynomial, where (i) may be the host vehicle or the target object vehicle:

$$C^i = F(X, Y)$$

FIG. 4 is a diagram illustrating an example of a CIP target vehicle 404 traveling around a roundabout. As shown in FIG. 4, the CIP target vehicle 404 has a path history 414 including multiple positions 405, which indicate locations of the CIP target vehicle 404 at different points in time (e.g., fixed time intervals).

The CIP target vehicle 404 also has a path history portion 412 which is behind a current location of the host vehicle 402, indicating previous positions 408 of the CIP target vehicle 404 which occurred behind the current location of the host vehicle 402.

FIG. 4 also illustrates a path history 410 of the host vehicle 402, including previous positions 406 of the host vehicle. In some example embodiments, the vehicle control module may be configured to compare the path history 410 of the host vehicle 402, with the path history portion 412 of the CIP target vehicle 404, in order to determine whether the host vehicle 402 is traveling the same path as previously traveled by the CIP target vehicle 404, or how much the path histories diverge from one another.

For example, referring again to FIG. 2, a quantification metric 120 and path rationalization 122 may be used to determine how much the path histories of the host vehicle and the CIP target vehicle diverge from one another, in order to determine whether the host vehicle should continue tracking a target vehicle as a CIP target vehicle. As an example, if the host vehicle is following an almost identical path history as previously travelled by the CIP target vehicle, the vehicle control module may make a determination 124 to continue holding the CIP target vehicle event if it takes are sharp turn, due to a likelihood that the host vehicle will follow the same sharp turn path as the CIP target vehicle.

The path rationalization 122 may be structured to facilitate determining whether to drop or hold a target vehicle as a CIP vehicle. For example, heading errors (e.g., piecewise localized heading errors) and lateral errors (e.g., piecewise localized lateral position errors) may be calculated between paths of the host vehicle and a target object vehicle, where the heading error and lateral error are combined using specified weighs into a single divergence index value. If the divergence index is greater than a threshold defined by the quantification metric 120, the vehicle control module may drop the previously tracked CIP target vehicle. Example equations for the lateral error ($C_0$), heading error ($C_1$) and divergence index (DI) may be calculated according to:

$$\Delta C_0(k) = c_0^o(k) - c_0^h(k)$$

$$\Delta C_1(k) = c_1^o(k) - c_1^h(k)$$

$$DI = K_0|\Delta C_0(k)| + K_1|\Delta C_1(k)|$$

If $DI > DI_0$, the vehicle control module may be configured to drop tracking of the target vehicle as a CIP vehicle. Otherwise, the vehicle control module may continue holding the target vehicle as the CIP vehicle.

The quantification metric 120 may use $DI_0$ as a threshold to determine whether to hold or drop a CIP target vehicle. An example equation for determining the threshold is:

DI=D_0 ΔC_0^min+D_1 ΔC_1^min ^min dΔC_1^{mim}imum lateral and heading error thresholds. $D_0$ and $D_1$ are gains to adjust $DI_0$ according to, e.g., a road type, road anomalies (such as construction zones) and a planned path of the host vehicle. In some example embodiments, the following equations may be used:

$$D_0 = D_0^t \times D_0^t \times D_0^p$$

$$D_1 = D_1^t \times D_1^t \times D_1^p$$

where $D_t$ is indicative of road types such as highway or urban, $D_a$ is indicative of whether road anomalies are present, and $D_p$ is indicative of a planned path that is going to be followed by the host vehicle (e.g., as indicated by route navigation, vehicle perception and vision data, etc.).

Figure 5:
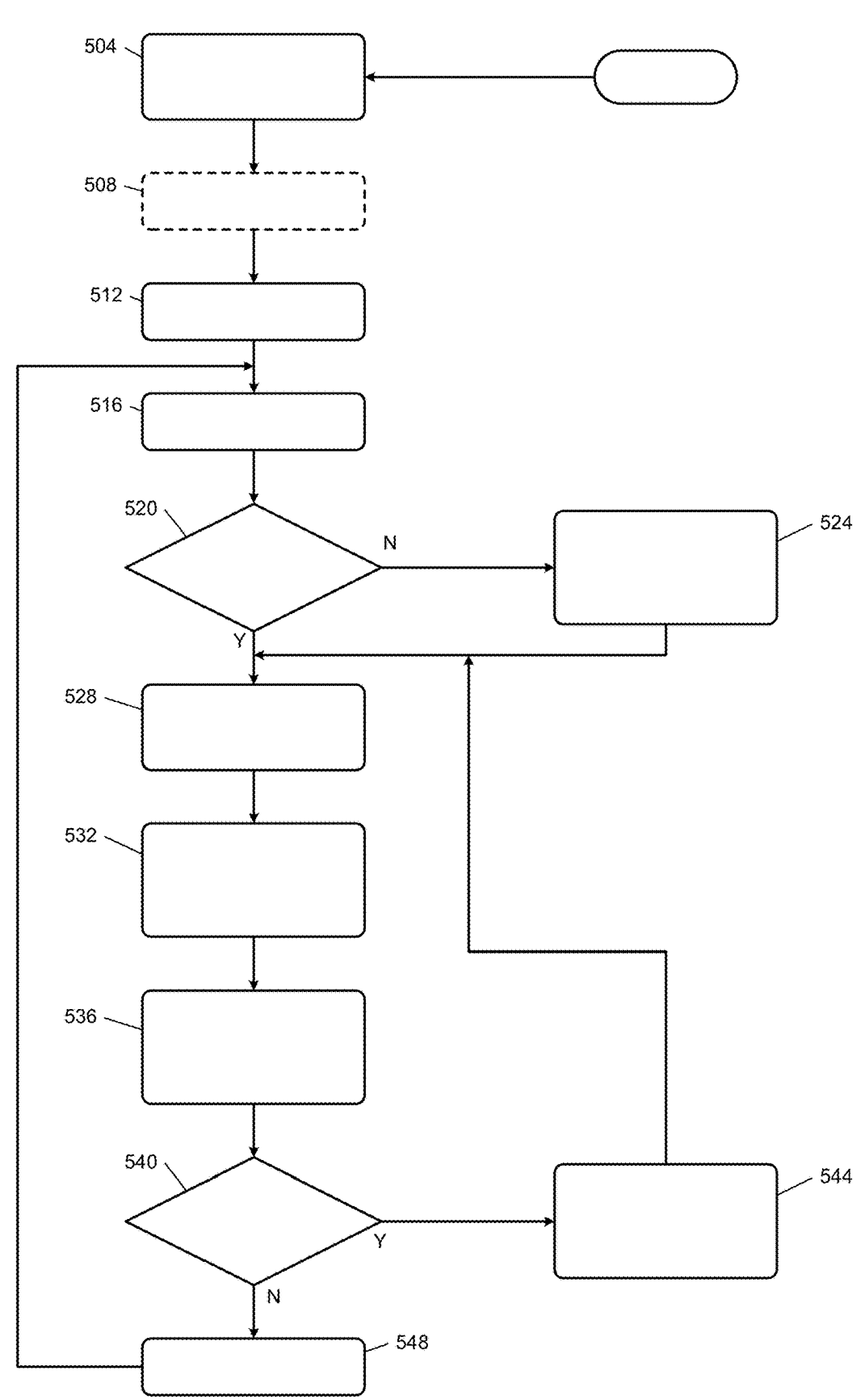
FIG. 5 is a flowchart depicting an example process for tracking a CIP target vehicle including a vehicle path history comparison.

FIG. 5 is a flowchart depicting an example process for tracking a CIP target vehicle including a vehicle path history comparison. The process illustrated in FIG. 5 may be performed by, for example, the vehicle control module 20 of FIG. 1. At 504, the process begins by detecting object within a threshold distance of a host vehicle.

Control may optionally obtain environmental context data at 508. The control module is then configured to determine host vehicle state variables at 512, such as lateral and longitudinal motion of the host vehicle. At 516, control identifies a closest in path target vehicle ahead of the host vehicle.

At 520, control determines whether an initial object path is available for the target vehicle. If not, control constructs an initial target object path using a road centerline and back propagation, at 524. After constructing the initial target object path, or if an initial object path is available (e.g., because the host vehicle has been following the target vehicle for a period of time), control obtains a path history for the host vehicle and for the target vehicle at 528.

At 532, control transforms the path history coordinates according to a current host vehicle position. The vehicle control module is configured to determine whether to hold or drop a current CIP target vehicle at 536. Further details regarding determining whether to hold or drop a current CIP target vehicle are discussed further below with reference to FIG. 6.

The vehicle control module is configured to determine at 540 whether the CIP target vehicle should be held or dropped. If control determines that the current CIP target vehicle should be held, control proceeds to 544 to continue controlling acceleration and braking of the host vehicle according to tracked movement of the CIP vehicle. Control then returns to 528 to obtain updated path histories for the host vehicle and the CIP target vehicle.

If control determines at 540 to drop the CIP target vehicle, control proceeds to 548 to drop the target vehicle from CIP tracking. Control then returns to 516 to identify a different target vehicle object as the new CIP vehicle for CIP tracking.

Figure 6:
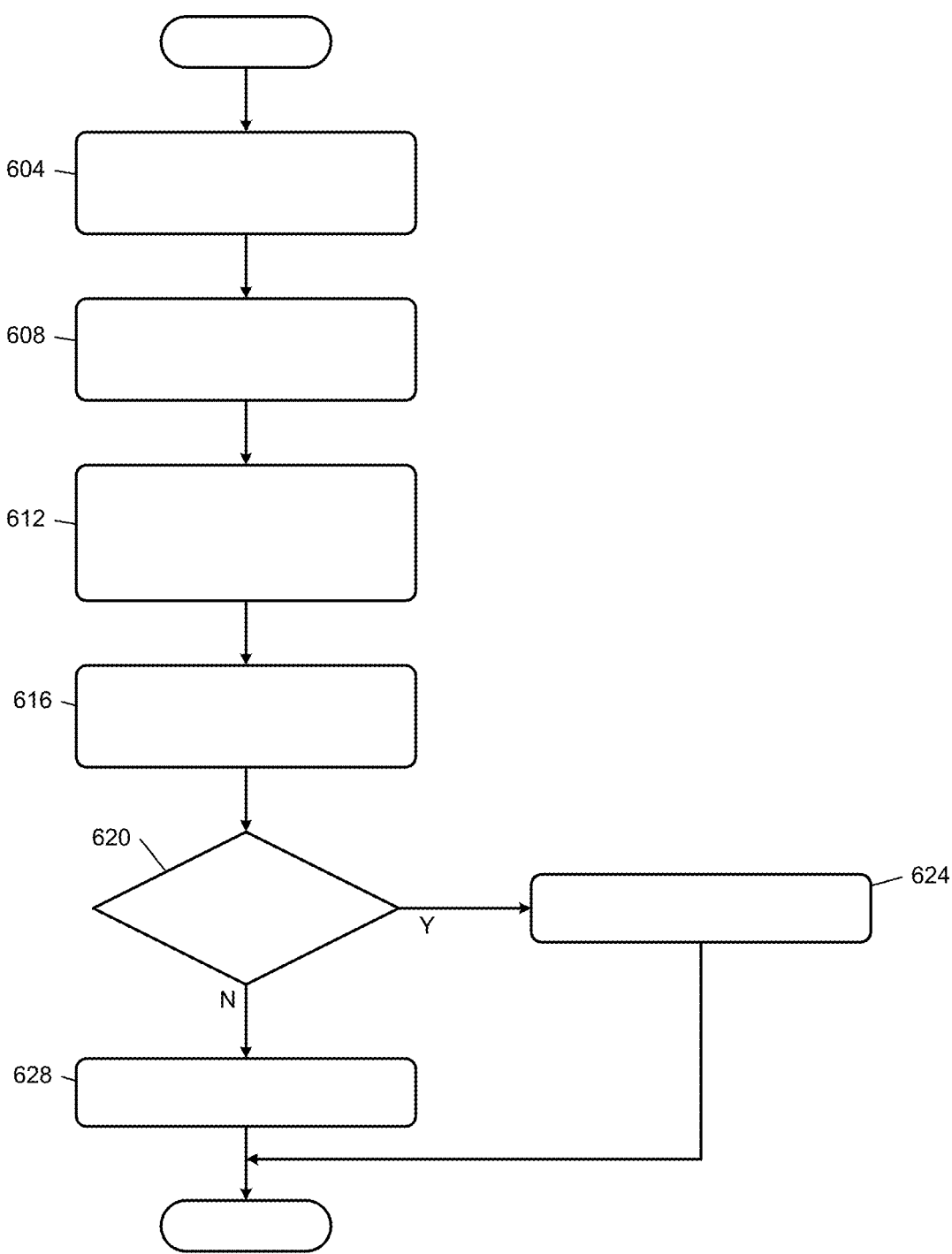
FIG. 6 is a flowchart depicting an example process for calculating a divergence index for a CIP target vehicle hold determination.

FIG. 6 is a flowchart depicting an example process for calculating a divergence index for a CIP target vehicle hold determination. The process illustrated in FIG. 5 may be performed by, for example, the vehicle control module 20 of FIG. 1. At 604, the process begins by obtaining road type parameters, road anomaly parameters, and planned vehicle path parameters.

At 608, the controller is configured to set a divergence threshold value according to the obtained parameters. The vehicle control module is then configured to obtain a lateral error between the host vehicle path history and the target vehicle path history, and a heading error between the host vehicle path history and the target vehicle path history.

At 616, the vehicle control module is configured to determine a divergence index based on the lateral and heading errors. If the divergence index is greater than the divergence threshold at 620, control proceeds to 624 to drop the target vehicle from CIP vehicle tracking. If control determines at 620 that the divergence index is not greater than the divergence threshold, control holds the target vehicle as the tracked CIP vehicle at 628.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for controlling automated vehicle acceleration and braking, the method comprising:

detecting, via at least one vehicle object sensor of a host vehicle, multiple target vehicles ahead of the host vehicle;

tracking movement of each of the multiple target vehicles;

determining a probabilistic forward travel path of the host vehicle;

selecting one of the multiple target vehicles having a lowest time to collision (TTC) with the host vehicle as a closest-in-path (CIP) target vehicle ahead of the host vehicle, based on the movement of each of the multiple target vehicles;

obtaining a path history of the CIP target vehicle, the path history including multiple historic positions of the CIP target vehicle at specified time intervals;

obtaining a path history of the host vehicle, the path history of the host vehicle including multiple historic positions of the host vehicle at the specified time intervals;

comparing the path history of the CIP target vehicle to the path history of the host vehicle to determine a divergence index; and in response to the divergence index being less than a specified divergence threshold, controlling automated acceleration and braking of the host vehicle based at least in part on tracked movement of the CIP target vehicle.

2. The method of claim 1, further comprising, in response to the divergence index being greater than the specified divergence threshold, dropping tracking of the CIP target vehicle, where automated acceleration and braking of the host vehicle is not controlled based on tracked movement of the CIP target vehicle.

3. The method of claim 2, further comprising, subsequent to dropping tracking of the CIP target vehicle:

identifying a second vehicle of the multiple target vehicles ahead of the host vehicle, the second vehicle different than the CIP target vehicle; and obtaining an initial path history of the second vehicle, the initial path history of the second vehicle including multiple historic positions of the second vehicle at the specified time intervals.

4. The method of claim 1, further comprising controlling automated lateral movement of the host vehicle via one or more steering actuators, based at least in part of tracked movement of the CIP target vehicle.

14

5. The method of claim 1, further comprising calculating the specified divergence threshold according to one or more gain parameters, wherein the one or more gain parameters include at least one of a highway road type, an urban road type, a presence of a road anomaly, and a route navigation path.

6. The method of claim 5, further comprising obtaining environmental context data associated with the host vehicle, wherein the environmental context data includes at least one of map data associated with a location of the host vehicle, road data associated with the location of the host vehicle, road anomaly data associated with the location of the host vehicle, route navigation data associated with the location of the host vehicle, and vehicle perception and vision data.

7. The method of claim 1, wherein determining the divergence index includes:

determining a piecewise localized lateral error position between the path history of the CIP target vehicle and the path history of the host vehicle;

determining a piecewise localized heading error between the path history of the CIP target vehicle and the path history of the host vehicle; and combining the piecewise localized lateral error position and the piecewise localized heading error to determine the divergence index based on the piecewise localized lateral error position and the piecewise localized heading error.

8. The method of claim 1, wherein obtaining the path history of the CIP target vehicle includes, in response to an initial detection of the CIP target vehicle as a newly selected target vehicle, constructing a virtual historic initial path of the CIP target vehicle using a systematic dynamically constructed backpropagation behind the CIP target vehicle.

9. The method of claim 1, further comprising:

determining current state variables of the host vehicle, wherein the current state variables include at least one of a lateral velocity of the host vehicle, a longitudinal velocity of the host vehicle, a yaw rate of the host vehicle, and driver input from at least one of a steering wheel or a pedal; and identifying an updated position of the host vehicle according to the current state variables.

10. The method of claim 9, further comprising:

transforming coordinates of the multiple historic positions of the CIP target vehicle to generate an updated path history of the CIP target vehicle;

transforming coordinates of the multiple historic positions of the host vehicle to generate an updated path history of the host vehicle; and comparing the updated path history of the CIP target vehicle to the updated path history of the host vehicle to determine an updated divergence index.

11. The method of claim 1, wherein the at least one vehicle object sensor includes at least one of a camera, a laser, or a lidar sensor.

12. A vehicle control system for controlling automated vehicle acceleration and braking, and steering, the vehicle control system comprising:

at least one vehicle object sensor configured to detect multiple target vehicles ahead of a host vehicle including a closest-in-path (CIP) target vehicle ahead of the host vehicle; and a vehicle control module of the host vehicle, the vehicle control module configured to:

track movement of each of the multiple target vehicles;

determine a probabilistic forward travel path of the host vehicle;

select one of the multiple target vehicles having a lowest time to collision (TTC) with the host vehicle as the CIP target vehicle ahead of the host vehicle, based on the movement of each of the multiple target vehicles;

obtain a path history of the CIP target vehicle, the path history including multiple historic positions of the CIP target vehicle at specified time intervals;

obtain a path history of the host vehicle, the path history of the host vehicle including multiple historic positions of the host vehicle at the specified time intervals;

compare the path history of the CIP target vehicle to the path history of the host vehicle to determine a divergence index; and in response to the divergence index being less than a specified divergence threshold, control automated acceleration, braking and steering of the host vehicle based at least in part on tracked movement of the CIP target vehicle.

13. The vehicle control system of claim 12, wherein the vehicle control module is configured to, in response to the divergence index being greater than the specified divergence threshold, drop tracking of the CIP target vehicle, where automated acceleration and braking of the host vehicle is not controlled based on tracked movement of the CIP target vehicle.

14. The vehicle control system of claim 13, wherein the vehicle control module is configured to, subsequent to dropping tracking of the CIP target vehicle:

identify a second vehicle of the multiple target vehicles ahead of the host vehicle, the second vehicle different than the CIP target vehicle; and obtain an initial path history of the second vehicle, the initial path history of the second vehicle including multiple historic positions of the second vehicle at the specified time intervals.

15. The vehicle control system of claim 12, wherein the vehicle control module is configured to calculate the specified divergence threshold according to one or more gain parameters, wherein the one or more gain parameters include at least one of a highway road type, an urban road type, a presence of a road anomaly, and a route navigation path.

16. The vehicle control system of claim 15, wherein the vehicle control module is configured to obtain environmental context data associated with the host vehicle, wherein the environmental context data includes at least one of map data associated with a location of the host vehicle, road data associated with the location of the host vehicle, road anomaly data associated with the location of the host vehicle, route navigation data associated with the location of the host vehicle, and vehicle perception and vision data.

17. The vehicle control system of claim 12, wherein determining the divergence index includes:

determining a piecewise localized lateral position error between the path history of the CIP target vehicle and the path history of the host vehicle;

determining a piecewise localized heading error between the path history of the CIP target vehicle and the path history of the host vehicle; and combining the piecewise localized lateral position error and the piecewise localized heading error to determine the divergence index based on the piecewise localized lateral error position and the piecewise localized heading error.

18. The vehicle control system of claim 12, wherein the vehicle control module is configured to:

determine current state variables of the host vehicle, wherein the current state variables include at least one of a lateral velocity of the host vehicle, a longitudinal velocity of the host vehicle, a yaw rate of the host vehicle, and driver input from at least one of a steering wheel and a pedal; and identify an updated position of the host vehicle according to the current state variables.

19. The vehicle control system of claim 12, wherein the at least one vehicle object sensor includes at least one of a camera, a laser, or a lidar sensor.

20. A vehicle control system for controlling automated vehicle acceleration and braking, and steering, the vehicle control system comprising:

at least one vehicle object sensor configured to detect multiple target vehicles ahead of a host vehicle including a closest-in-path (CIP) target vehicle ahead of the host vehicle; and a vehicle control module of the host vehicle, the vehicle control module configured to:

track movement of each of the multiple target vehicles;

determine a probabilistic forward travel path of the host vehicle;

select one of the multiple target vehicles having a lowest time to collision (TTC) with the host vehicle as the CIP target vehicle ahead of the host vehicle, based on the movement of each of the multiple target vehicles;

obtain a path history of the CIP target vehicle, the path history including multiple historic positions of the CIP target vehicle at specified time intervals;

obtain a path history of the host vehicle, the path history of the host vehicle including multiple historic positions of the host vehicle at the specified time intervals;

compare the path history of the CIP target vehicle to the path history of the host vehicle to determine a divergence index;

in response to the divergence index being less than a specified divergence threshold, control automated acceleration, braking and steering of the host vehicle based at least in part on tracked movement of the CIP target vehicle;

transforming coordinates of the multiple historic positions of the CIP target vehicle to generate an updated path history of the CIP target vehicle;

transforming coordinates of the multiple historic positions of the host vehicle to generate an updated path history of the host vehicle; and comparing the updated path history of the CIP target vehicle to the updated path history of the host vehicle to determine an updated divergence index.

* * * * *